June 13, 1939.  B. S. LACY  2,162,619
METALLURGICAL PROCESS
Filed Oct. 25, 1937
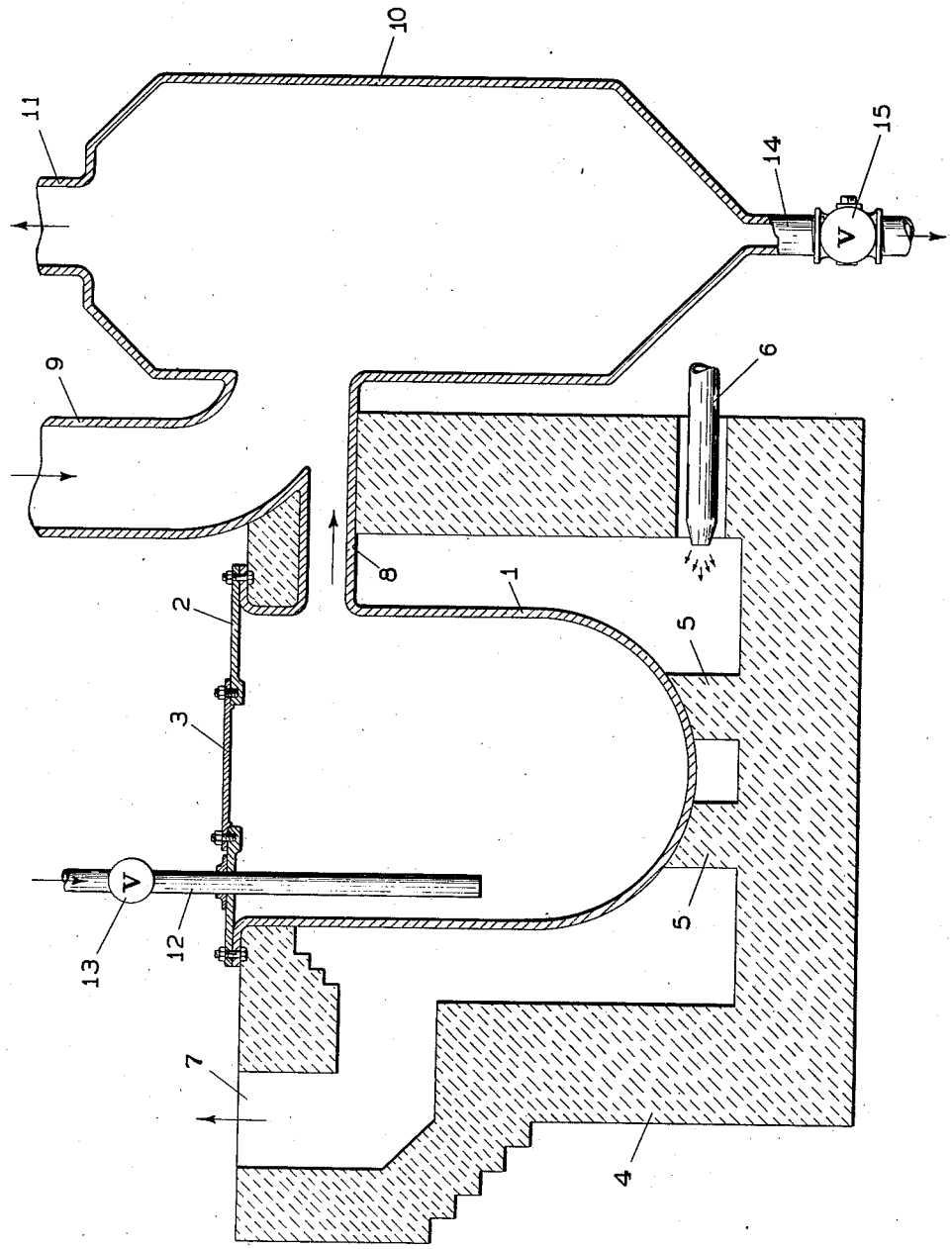
INVENTOR.
BURRITT S. LACY
BY *Theodore T. Budrow*
ATTORNEY.

Patented June 13, 1939

2,162,619

UNITED STATES PATENT OFFICE 2,162,619

METALLURGICAL PROCESS

Burritt S. Lacy, Lewiston, N. Y., assignor to E. I. du Pont de Nemours & Company, Wilmington, Del., a corporation of Delaware Application October 25, 1937, Serial No. 170,856

9 Claims. (Cl. 75—66)

This invention relates to the production of an alkali metal by the thermal reduction of its compounds.

Alkali metal, for example sodium, may be prepared by thermal reduction of its common compounds such as sodium carbonate, sodium chloride and the like. Such reduction is carried out by heating the sodium compound in the presence of a suitable reducing agent, whereby sodium vapor is produced and recovered. For example, one method which has been proposed consists in heating a mixture of sodium carbonate and carbon to a temperature of 1000° C. or higher whereby the sodium carbonate is reduced to form sodium vapors which are collected and condensed. In a similar manner sodium chloride or other sodium compound may be reduced to sodium vapor by heating together with calcium carbide. In these thermal reduction processes, a high yield of sodium is difficult to obtain because the reactions are more or less reversible, the sodium vapor tending to react with the other reaction products. In order to prevent such reverse reactions and obtain an adequate yield of the alkali metal, it is necessary to quickly cool the reaction products to a relatively low temperature. Heretofore, the only methods proposed for this have involved the use of condensers into which the vapor is passed after leaving the reaction zone.

An object of the present invention is to provide an improved method for manufacturing an alkali metal by a thermal reduction process. A further object is to provide an improved method for cooling alkali metal vapors resulting from a thermal reduction reaction of the type described above. Other objects will be apparent from the following description of my invention.

The above objects are obtained in accordance with the present invention by intimately mixing the sodium vapor leaving the reaction zone with a sufficiently large volume of a cooler inert gas to suddenly lower the temperature of the vapors. Various non-oxidizing gases may be used for this purpose, e. g., hydrogen, hydrocarbons, nitrogen or carbon monoxide or various mixtures of such gases.

In one method of practicing my invention I may heat a mixture of sodium carbonate and carbon out of contact with the air to a temperature of about 1100 to 1200° C. and lead the resulting sodium vapors mixed with gaseous reaction by-products directly from the reaction zone into a receiver of relatively large volume. At the point where the hot vapors enter the receiver I introduce a rapid stream of hydrogen, carbon monoxide or other non-oxidizing gas. The rate of flow of the gas into the stream of vapor is so related to the rate of flow of vapor that the temperature of the vapor-hydrogen mixture is not more than about 300 to 700° C. I prefer to add the cooling gas at such rate that the temperature of the resulting mixture will be not more than about 400° C. The amount of gas required obviously will depend upon the relative temperatures of the sodium vapor and of the gas and may readily be calculated. Obviously, the lower the gas temperature the less of it will be required to attain the desired cooling effect. I prefer to use a cooling gas which is at around 20–100° C. Preferably, the molten metal thus obtained is further cooled by applying external cooling to the walls of the receiver or by blowing the hot sodium into an externally cooled pipe or chamber where it may be cooled to a temperature suitable for casting in molds, e. g. 100 to 150° C.

One form of apparatus suitable for practicing my invention is illustrated diagrammatically by the drawing. A steel retort 1, in the form of an upright cylinder with a hemispherical bottom, is arranged in furnace setting 4. Retort 1 is provided with steel cover 2. An aperture in cover 2, which is closed by cover 3, is adapted for introduction of reacting materials. The retort is partially supported in the furnace setting by piers 5. Heat is provided by means of burner 6 and the products of combustion therefrom are led off through outlet 7. Preferably the burner 6 is arranged so that the burning gases enter the furnace in a direction tangential to the exterior surface of the retort. The combustion gases are led out of the furnace by way of flue 7. Retort 1 is also provided with a gas inlet 12 having valve 13, this inlet passing through the cover 2 of the retort. The retort is further provided near the upper end thereof with vapor outlet 8 which connects the retort with receiver 10. Cooling gas inlet 9 is also connected with receiver 10 at the same point. The receiver, which may be constructed of steel or other suitable heat conducting material, is provided with an outlet 14 at the bottom, which outlet is provided with valve 15. Receiver 10 is further provided at the top with gas outlet 11. Vapor outlet 8 and cooling gas inlet 9 preferably enter receiver 10 in a tangential direction, so that the incoming gases are caused to have a swirling motion within the receiver.

In carrying out my process by means of the above described apparatus, I first charge retort 1 with a suitable quantity of intimately mixed finely divided soda ash and carbon. The charging opening in cover 2 then is tightly closed by means of cover 3 and an inert gas such as hydrogen or carbon monoxide is passed through the apparatus by way of pipe 12 until substantially all the air is swept out from retort 1 and receiver 10. Valve 13 then is closed and heat is applied to the retort by means of burner 6 so as to maintain a temperature of about 1000–1200° C. in the retort. When the reaction has started and the vapors begin to pass out through outlet 8, cold carbon monoxide or hydrogen is passed in through inlet 9. The quantity of cooling gas is adjusted so as to maintain a temperature of around 300–400° C. in receiver 10. Preferably the receiver, or at least the lower portion thereof, is further cooled by blowing air against it by means of a suitable fan and, if desired, this cooling may be furthered by providing the lower portion of receiver 10 with suitable fins or like heat radiating elements. The sodium vapor condenses in receiver 10 and the liquid sodium may be removed from time to time as desired through pipe 14 by opening valve 15.

In the production of sodium by reacting sodium carbonate with carbon in accordance with my invention, I prefer to use carbon monoxide as the cooling gas. Carbon monoxide is a by-product of the reaction and is, therefore, readily available. Preferably, a large volume of cold carbon monoxide is rapidly mixed with the gaseous reaction products, cooling the latter from the reaction temperature down to 300 to 400° C. This causes condensation of the sodium vapors in the chamber where the cooling is effected and the carbon monoxide passes on. A portion of the carbon monoxide equal to the amount formed in the reduction reaction may be removed from the system and the remainder cooled, e. g. to 20 to 100° C. and recycled to cool succeeding reaction products. Thus, the entire process may be carried out as a continuous cyclic process, a portion of the carbon monoxide being repeatedly cooled and mixed with the reaction products to cool them.

The amount of cooling gas required to cool the reaction products to a given temperature will depend on the initial temperature and volume of the reaction products and the specific heat and temperature of the cooling gas and is readily calculated. Thus, in the reduction of sodium carbonate with carbon, the reaction is:

the reaction product consisting of a mixture of two volumes of sodium vapor and three volumes of carbon monoxide. To cool the reaction product from a temperature of 1100° C. down to 700° C., seven volumes of carbon monoxide at 100° C. (or 1.4 volumes per volume of reaction product) will be required. To cool the same product down to 400° C. will require 36 volumes of carbon monoxide at 100° C. (or 7.2 volumes per volume of reaction product).

While it is usually preferable to rapidly cool the reaction products from the reaction temperature, that is not always necessary. It is only necessary that the rapid cooling commence at a temperature at which the alkali metal does not readily react with the reaction by-products. For example, in the above mentioned reduction of sodium carbonate, the reduction reaction may proceed at a temperature of 1100–1200° C., or even much higher if desired. The initial temperature of the reaction products then may be considerably higher than 1100° C. The reaction products then may be cooled in any desired fashion without any substantial amount of sodium tending to react with the by-product carbon monoxide. However, in order to prevent substantial reaction between the sodium vapor and the carbon monoxide, the reaction products must be quickly cooled down to 700° C. or lower, when the temperature of the reaction products becomes lowered to about 1100° C.

In carrying out the above thermal reduction reaction and similar reactions, it is sometimes advantageous also to pass a gas through the reaction chamber in a small amount. The purpose of such gas flow is to positively prevent the entrance of oxygen into the reaction chamber and also to aid rapid removal of the gaseous reaction products from the reaction zone. I prefer to keep the amount of such auxiliary gas passed through the reaction zone at a minimum, for example, at a fraction of the volume of sodium vapors produced, in order that the amount of cooling gas required will not be excessive.

The present invention is not restricted to the above described reaction of carbonate with carbon but may be used likewise with other known methods for thermal reduction of alkali metal compounds to obtain alkali metal vapor. For example, the sodium vapor obtained by reacting a sodium salt such as sodium chloride with a metal carbide, such as calcium carbide or other similar reducing agent, likewise may be cooled by my herein described method. The critical temperatures and other factors will vary somewhat for the different reactions but the principle of operation and method will be the same as illustrated by the above discussion.

In carrying out the present invention, it is preferable to maintain the pressure in the receiver or collecting chamber at about atmospheric pressure. However, it is obvious that the invention is not restricted to the use of atmospheric pressure, since substantially the same advantageous rapid cooling may be obtained by operating the system either in vacuo or at super-atmospheric pressure.

Under some conditions, when hydrogen is used as the cooling gas in the practice of the present invention, more or less of the sodium vapor may react with the hydrogen to form sodium hydride. Such formation of sodium hydride is not necessarily disadvantageous in the practice of the present invention. Sodium hydride is in itself a valuable product and, if desired, may be recovered as such. If only the metallic sodium is desired as a product, the hydride after its recovery may readily be decomposed by heating to form metallic sodium and free hydrogen. Generally, when hydrogen is used in my process, the process may be so controlled that there is little or no hydride formation and the rapidly cooled sodium vapors quickly condense inside the receiver to form molten sodium.

I claim:

1. The process comprising heating an alkali metal compound with a reducing agent to produce alkali metal vapor and rapidly cooling said vapor to a temperature not higher than about 700° C. by mixing said vapor with a cooling gas so as to condense said vapor to liquid alkali metal.

2. The process comprising heating an alkali metal compound with a reducing agent to produce alkali metal vapor and rapidly cooling said vapor to a temperature of 300–400° C. by mixing said vapor with a non-oxidizing gas so as to condense said vapor to liquid alkali metal.

3. The process comprising heating a sodium compound with a reducing agent to produce sodium vapor and rapidly cooling said vapor to a temperature not higher than about 700° C. by mixing said vapor with a non-oxidizing gas so as to condense said sodium vapor to liquid sodium.

4. The process comprising heating an alkali metal salt with a reducing agent to produce alkali metal vapor and rapidly cooling said vapor to a temperature of 300–400° C. by mixing said vapor with a non-oxidizing gas so as to condense said vapor to liquid alkali metal.

5. The process comprising heating sodium carbonate with carbon to produce sodium vapor and rapidly cooling said vapor to a temperature not higher than about 700° C. by mixing said vapor with a non-oxidizing gas so as to condense said sodium vapor to liquid sodium.

6. The process comprising heating sodium carbonate with carbon to produce sodium vapor and rapidly cooling said vapor to a temperature of 300–400° C. by mixing said vapor with carbon monoxide.

7. The process comprising reacting sodium carbonate with carbon at a temperature not lower than about 1100° C. to produce a mixture of sodium vapor and carbon monoxide and rapidly mixing said mixture with a sufficient volume of carbon monoxide at a temperature of about 20 to 100° C. to cool the sodium to a temperature of 300 to 400° C.

8. The process comprising heating an alkali metal salt with a metal carbide to produce alkali metal vapor and rapidly cooling said vapor to a temperature not higher than about 700° C. by mixing said vapor with a cooling gas so as to condense said vapor to liquid alkali metal.

9. The process comprising heating sodium chloride with calcium carbide to produce sodium vapor and rapidly cooling said vapor to a temperature of 300–400° C. by mixing said vapor with a non-oxidizing gas so as to condense said sodium vapor to liquid sodium.

BURRITT S. LACY.